(12) United States Patent
Roy

(10) Patent No.: US 6,580,821 B1
(45) Date of Patent: Jun. 17, 2003

(54) METHOD FOR COMPUTING THE LOCATION AND ORIENTATION OF AN OBJECT IN THREE DIMENSIONAL SPACE

(75) Inventor: Sebastien Roy, Montreal (CA)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/538,208

(22) Filed: Mar. 30, 2000

(51) Int. Cl.$^7$ .............................. G06K 9/00; G06K 9/62; G06K 9/36

(52) U.S. Cl. ....................... 382/154; 382/285; 382/118; 382/216

(58) Field of Search ................................ 382/287, 154, 382/216, 201, 118, 285, 190, 195, 203, 291, 115

(56) References Cited

U.S. PATENT DOCUMENTS

| | | | | |
|---|---|---|---|---|
| 4,860,216 A | * | 8/1989 | Linsenmayer | 342/159 |
| 4,975,969 A | * | 12/1990 | Tal | 382/116 |
| 6,243,488 B1 | * | 6/2001 | Penna | 382/154 |
| 6,434,278 B1 | * | 8/2002 | Hashimoto | 382/285 |

OTHER PUBLICATIONS

Huttenlocher et al., Recognizing Solid Objects by Alignment with an Image, 1990, Internal Jouranl of Computer Vision, Kluwer Academic Publishers, 5:2, 195–212.*

Fischler et al., Random Sample Consensus: A Paradigm for Model Fitting with Applications to Image Analysis and Automated Cartography, 1981, SRI International 1981, 391–395.*

P.N. Belhumeur et al., "What Is the Set of Images of an Object under All Possible Illumination Conditions?", International Journal of Computer Vision, 1998, pp. 1–16.

P.N. Belhumuer et al., "The Bas–Relief Ambiguity", In the Proceedings of CVPR97.

P.N. Belhumeur et al., "Comparing Images Under Variable Illumination", To appear in the Proceedings of CVPR98.

R.A. Brooks, "Symbolic Reasoning Among 3–D Models and 2–D Images", Artificial Intelligence 17, 1981, pp. 285–345.

R.A. Brooks, "Model–Based Three–Dimensional Interpretations of Two–Dimensional Images", IEEE Transactions on Pattern Analysis and Machine Intelligence, 1983, pp. 140–150.

(List continued on next page.)

Primary Examiner—Leo Boudreau
Assistant Examiner—Shefali Patel
(74) Attorney, Agent, or Firm—Scully, Scott, Murphy & Presser

(57) ABSTRACT

A method for computing the location and orientation of an object in three-dimensional space. The method comprises the steps of: (a) marking a plurality of feature points on a three-dimensional model and corresponding feature points on a two-dimensional query image; (b) for all possible subsets of three two-dimensional feature points marked in step (a), computing the four possible three-dimensional rigid motion solutions of a set of three points in three-dimensional space such that after each of the four rigid motions, under a fixed perspective projection, the three three-dimensional points are mapped precisely to the three corresponding two-dimensional points; (c) for each solution found in step (b), computing an error measure derived from the errors in the projections of all three-dimensional marked points in the three-dimensional model which were not among the three points used in the solution, but which did have corresponding marked points in the two-dimensional query image; (d) ranking the solutions from step (c) based on the computed error measure; and (e) selecting the best solution based on the ranking in step (d). Also provided is a program storage device readable by machine, tangibly embodying a program of instructions executable by the machine to perform the method steps of the present invention and a computer program product embodied in a computer-readable medium for carrying out the methods of the present invention.

24 Claims, 10 Drawing Sheets

OTHER PUBLICATIONS

R.A. Brooks et al., "The AGRONYM Model–Based Vision System", Proceedings of the Sixth International Joint Conference on Artificial Intelligence, 1979, pp. 105–113.

P. Dupuis et al., "Direct Method For Reconstructing Shape From Shading", IEEE 1992, pp. 453–458.

P. Dupuis et al., "Direct Method for Reconstructing Shape From Shading", DARPA Image Understand, 1992, pp. 563–571.

J. Oliensis et al., "Direct method for reconstructing shape from shading", SPIE, 1991, pp. 116–128.

A.S. Georghiades et al., "Illumination Cones for Recognition Under Variable Lighting: Faces", To appear in the Proceedings of CVPR98.

W.E.L. Grimson et al., "On the Verification of Hypothesized Matches in Model–Based Recognition", IEEE Transactions on Pattern Analysis and Machine Intelligence, 1991, pp. 1201–1213.

B.K.P. Horn, "Understanding Image Intensities", Artificial Intelligence 8, 1977, pp. 201–231.

B.K.P. Horn et al., "Calculating the reflectance map", Applied Optics, 1979, pp. 1770–1779.

B.K.P. Horn, "Hill–Shading and the Reflectance Map", Proceedings of the IEEE, vol. 69, 1981, pp. 14–47.

B.K.P. Horn, "Hill–Shading and the Reflectance Map", Artificial Intelligence Laboratory, pp. 79–120.

D.P. Huttenlocher et al., "Object Recognition Using Alignment", DARPA Image Understanding Workshop, 1987, pp. 370–379.

D.P. Huttenlocher et al., "Object Recognition Using Alignment", IEEE, 1987, pp. 102–111.

D.P. Huttenlocher et al., "Recognizing Solid Objects by Alignment with an Image", International Journal of Computer Vision, 1990, pp. 195–212.

D.P. Huttenlocher et al., "Recognizing Solid Objects by Alignment", DARPA Image Understanding Workshop, 1998, pp. 1114–1122.

M. Kirby et al., "Application of the Karhunen–Loeve Procedure for the Characterization of Human Faces", IEEE, 1990, pp. 103–108.

J.J. Koenderink et al., "Photometric invariants related to solid shape", OPTICA ACTA, 1980, pp. 981–996.

D.G. Lowe, "Fitting Parameterized Three–Dimensional Models to Images", IEEE Transactions on Pattern Analysis and Machine Intelligence, 1991, pp. 441–450.

D.G. Lowe, "Visual Recognition From Spatial Correspondence And Perceptual Organization", pp. 953–959.

D.G. Lowe, "Three–Dimensional Object Recognition from Single Two–Dimensional Images", 1987, pp. 355–395.

J. Oliensis et al., "A Global Algorithm for Shape from Shading", IEEE, 1993, pp. 692–701.

J. Olienis et al., "Provably Convergent Algorithms for Shape from Shading", Image Understanding Workshop, 1993, pp. 1121–1130.

J. Olienis, "Shape from Shading as a Partially Well–Constrained Problem", CVGIP 1991, pp. 163–183.

J. Olienis, "Shape from Shading as a Partially Well–Constrained Problem", IEEE, 1991, pp. 559–564.

J. Olienis, "New Results In Shape From Shading", Image Understanding Workshop, 1990, pp. 145–153.

J. Olienis, "Uniqueness in Shape from Shading", International Journal of Computer Vision, 1991, pp. 75–104.

J. Olienis, "Existence and Uniqueness in Shape from Shading", IEEE, 1990, pp. 341–345.

P.S. Penev, "Local Feature Analysis: A general statistical theory for object representation", 1996, pp. 1–27.

L.G. Roberts, "Machine Perception of Three–Dimensional Solids", Massachusetts Institute of Technology Lincoln Laboratory, Technical Report No. 315, 1965, pp. 1–40.

A. Shashua, "Geometry and Photometry in 3D Visual Recognition", Massachusetts Institute of Technology, 1992, pp. 1–165.

L. Sirovich et al., "Low–dimensional procedure for the characterization of human faces", Optical Society of America, 1987, pp. 519–524.

M.A. Turk et al., "Face Recognition Using Eigenfaces", IEEE, 1991, pp. 586–591.

S. Ullman et al., "Recognition by Linear Combinations of Models", IEEE, 1991, pp. 992–1006.

T. Vetter, "Synthesis of novel views from a single face image", Max–Planck–Institute Technical Report No. 26, 1996, pp. 1–13.

T. Vetter et al., "Estimating Coloured 3D Face Models from Single Images: An Example Based Approach", European Conference on Computer Vision vol. 2, pp. 499–512.

P. Viola et al., "Alignment by Maximization of Mutual Information", To appear at the International Conference on Computer Vision, 1995.

L. Wiskott et al., "Face Recognition by Elastic Bunch Graph Matching", IEEE Transactions on Pattern Analysis and Machine Intelligence, vol. 19, 1997, pp. 775–779.

P.H. Winston, "Obtaining Shape From Shading Information", The Psychology of Computer Vision, pp. 115–155.

B.K.P. Horn et al., "Calculating The Reflectance Map", Artificial Intelligence Laboratory, pp. 115–126.

M. Turk et al., Eigenfaces for Recognition:, Journal of Cognitive Neurosociency, vol. 3, No. 1, 1991, pp. 71–86.

D.P. Huttenlocher, "Three–Dimensional Recognition of Solid Objects from a Two–Dimensional Image", MIT Artificial Laboratory, Technical Report 1045, 1988, pp. 1–161.

D.P. Huttenlocher et al., "Object Recognition Using Alignment", IEEE, 1987, pp. 102–111.

R. Zurmuhl, "Praktische Mathematik", Springer–Verlag, 1965, pp. 60–65.

M.A. Fischler et al., "Random Sample Consensus: A Paradigm for Model Fitting with Application to Image Analysis and Automated Cartography", SRI International 1981, pp. 381–395.

D.P. Huttenlocher et al., "Recognizing Solid Objects by Alignment with an Image", International Journal of Computer Vision, 1990, pp. 195–212.

A.R. Brooks, "Symbolic Reasoning Among 3–D Models and 2–D Images", Dissertation 1981, pp. 1–172.

B.K.P. Horn, "Shape From Shading: A Method For Obtaining The Shape Of A Smooth Opaque Object From One View", Massachusetts Institute of Technology, 1970, pp. 1–197.

* cited by examiner

METHOD FOR COMPUTING THE LOCATION AND ORIENTATION OF AN OBJECT IN THREE DIMENSIONAL SPACE

BACKGROUND OF THE INVENTION

1. Field of the Invention

This invention relates to computer vision and more particularly to the computation of the location and orientation (alternatively referred to as "pose") of an object in three dimensional (3D) space.

2. Prior Art

Apparatus for capturing 3-dimensional (henceforth, 3D) models of people's faces are known in the art. These apparatus simultaneously capture pictures of the faces in registration with the 3D models that are captured. The 3D models consist of the 3-dimensional coordinates of a large number of points on the surface of the face, typically on the order of 640×640, along with the color picture value at each point. This provides the possibility of realistic computer graphics rendering of the faces from any vantage point. It is envisioned that this device can be used to capture a large number of face models. In some applications, this number could reach on the order of one million faces or more.

One application of this device is face identification, i.e., given a query consisting of an arbitrary two-dimensional (2D) photograph of a face, to search a large database of previously captured 3D models of faces to find the model which best matches the 2D photograph.

There are numerous obstacles to be overcome to accomplish this.

In general, there is no knowledge or control of the conditions under which the query photograph was acquired. Therefore, the pose (i.e. the position and orientation of the subject) and the lighting conditions of the query photograph are unknown.

There have been numerous approaches to the problem of face recognition. We focus on one class of paradigms for matching a query to a model in this setting, which begins with the task of determining the pose of the face in the query, where the "pose" is defined as the 3D position and orientation of the face.

It is that task, pose determination, that the present invention, is concerned with. There is considerable prior art concerned with finding the pose of 3D objects given a 2D photograph. The present invention is interested in the case where a set of 3D models is available. The methods of the prior art for dealing with this problem can be divided into two classes:

1. Those based on "features" extracted from the 2D image which are compared to corresponding features in some 3D model; and
2. Those that use the image directly.

The methods of the present invention fall into the first class. Features that have been used by prior artisans range from hand-selected points, to automatically detected points such as "corners", extrema, lines, line junctions, and curves. The present invention deals only with the simplest of these methods, which takes as input 2 sets of points. The first set of points is marked by hand on a 3D model, resulting in 3D coordinates of the points. The second set of points is similarly marked by hand on a 2D image of a similar object. The correspondence between the 3D and 2D points is known, i.e., for each of the 3D points there is exactly one 2D point which is known to correspond to it, and vice versa. By saying that a 3D point "corresponds" to a 2D point, it is meant that the points represent the same feature of the object, e.g., the left corner of the left eye of some person's face, or the left rear corner of the left wing of an airplane. The problem to be solved is to compute the rigid motion of the 3D point set, all points moving identically together, such that the perspective projection (i.e., the camera image) of the 3D point set will be the 2D point set. This is equivalent to finding the position and orientation of a perspective projection camera so that the picture it takes of the 3D point set will be the 2D point set. This is sometimes called the "perspective n-point problem," where n is the number of points involved.

There have been many practitioners who have crafted solutions to the perspective n point problem. These range from relatively straightforward least squares solutions, to statistical selection techniques, through what is now commonly called "recognition by alignment."

There are several problems with existing methods for this problem. The first problem is that when there are more than 3 pairs of corresponding points, it is not in general possible to obtain a closed form solution. For larger numbers of points, a least squares approach is required. In general, because of the nonlinear nature of the perspective projection (i.e., perspective contains a division by the z coordinate), and the nonlinear effects in the 2D image of rotations in 3D space, the least squares problem must be solved by iterative methods. Iterative methods are slow compared to closed form solutions, and in the applications of concern, it will eventually be required to solve this problem for up to hundreds of millions or more different sets of 3D points for each query, so that speed is important. It is further desirable that for graphic display purposes, the solution be so fast that it can be done in real time to provide a smooth graphic display of the effect of altering point positions on the resulting solution.

SUMMARY OF THE INVENTION

Therefore it is an object of the present invention to provide a method for computing the location and orientation of an object in three dimensional space which is fast as compared to the methods of the prior art.

It is a further object of the present invention to provide a method for computing the location and orientation of an object in three dimensional space which is not only fast as compared to the methods of the prior art but also robust.

It is yet a further object of the present invention to provide a method for computing the location and orientation of an object in three dimensional space which is well suited to an application, where a small number of manually marked points with known correspondences must be used to find pose.

It is yet a further object of the present invention to provide a method for computing the location and orientation of an object in three dimensional space which does not require knowledge of a camera model, or need to solve for a camera model.

It is still yet a further object of the present invention to provide a method for computing the location and orientation of an object in three dimensional space which is computationally simpler than the heuristics and iterative solutions of the prior art.

Accordingly, a method for computing the location and orientation of an object in three-dimensional space is provided. The method comprises the steps of: (a) marking a plurality of feature points on a three-dimensional model and corresponding feature points on a two-dimensional query image; (b) for all possible subsets of three two-dimensional feature points marked in step (a), computing the four possible three-dimensional rigid motion solutions of a set of three points in three-dimensional space such that after each of the four rigid motions, under a fixed perspective projection, the three three-dimensional points are mapped precisely to the three corresponding two-dimensional points; (c) for each solution found in step (b), computing an error measure derived from the errors in the projections of all three-dimensional marked points in the three-dimensional model which were not among the three points used in the solution, but which did have corresponding marked points in the two-dimensional query image; (d) ranking the solutions from step (c) based on the computed error measure; and (e) selecting the best solution based on the ranking in step (d).

In a first variation of the method of the present invention, the method further comprises, after step (a), the step of computing a predetermined number of perturbed points derived from each of the feature points wherein the computation of step (b) is on all possible subsets of three two-dimensional points marked in the query image, and in addition on the corresponding perturbed points. Typically, the predetermined number of perturbed points are obtained by sampling from a spherical Gaussian distribution.

In a second variation of the method of the present invention, the method further comprises, after step (d), the steps of: (i) choosing a subset of the solutions from step (c) based on the ranking of step (d); (ii) computing a predetermined number of perturbed points derived from each of the subset of the solutions; (iii) repeating step (b) on the predetermined number of perturbed points; and (iv) repeating step (c) for each solution found in step (iii); wherein the ranking of step (d) is based on the error computed in both steps (c) and (iv). Preferably, the subset of solutions chosen is a predetermined portion of the ranked solutions, such as the top 10% of the ranked solutions.

Still further provided is a program storage device readable by machine, tangibly embodying a program of instructions executable by the machine to perform the method steps of the methods and variations thereof of the present invention and a computer program product embodied in a computer-readable medium for carrying out the methods, and variations thereof, of the present invention. Preferably, the computer program has modules corresponding to the steps of the methods and variations thereof of the present invention.

BRIEF DESCRIPTION OF THE DRAWINGS

These and other features, aspects, and advantages of the methods of the present invention will become better understood with regard to the following description, appended claims, and accompanying drawings where:

DETAILED DESCRIPTION OF THE PREFERRED EMBODIMENT

Figure 1:
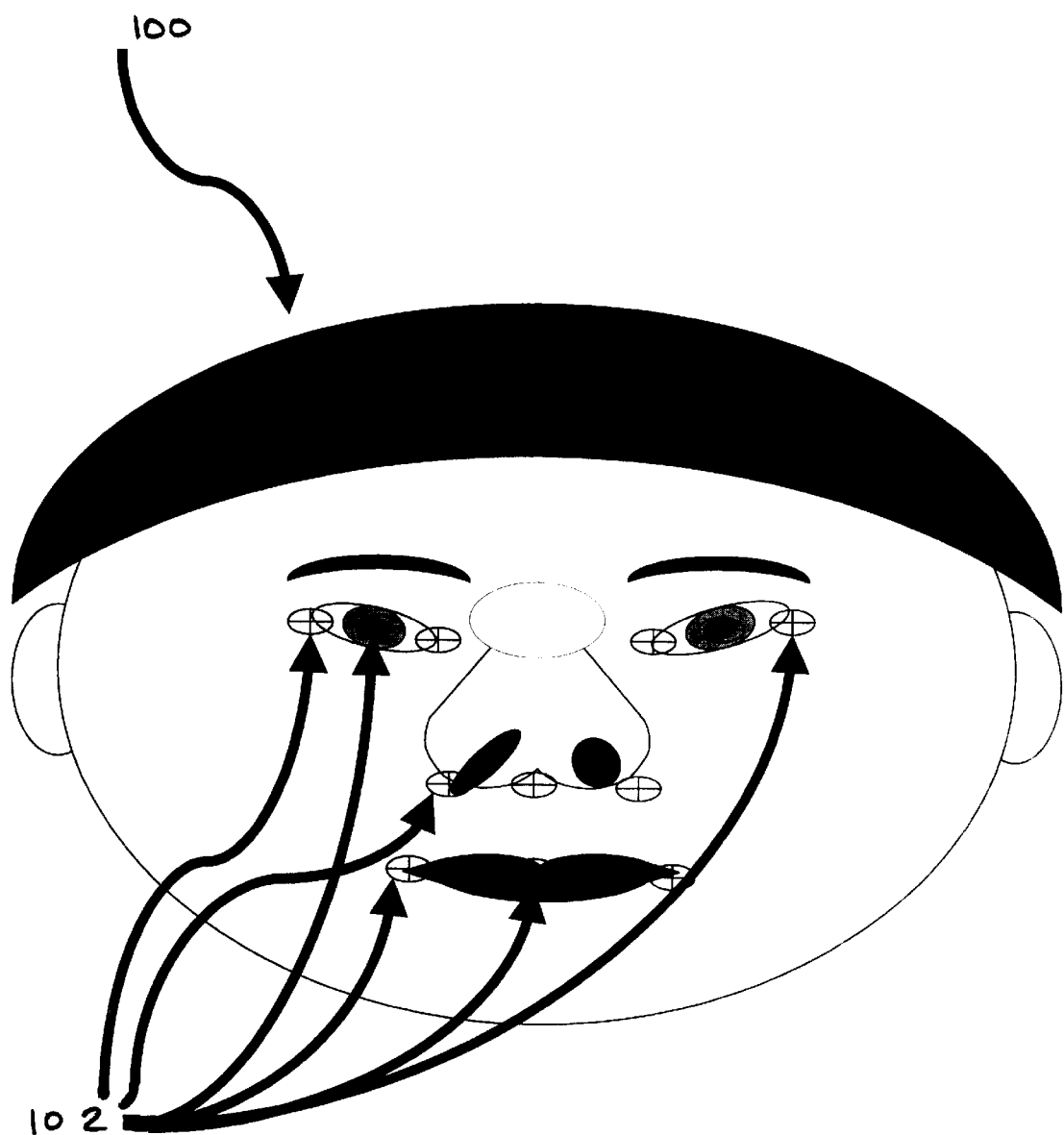
FIG. 1 illustrates a schematic representation of a two dimensional mapping of a three dimensional model of a human face.

Although this invention is applicable to numerous and various types of objects to be recognized, it has been found particularly useful in the environment of human face recognition. Therefore, without limiting the applicability of the invention to human face recognition, the invention will be described in such environment.

The methods of the present invention are pose estimation methods. In a system where a 2D photographic query is to be matched to a 3D model in a large database of such models by predicting the appearance of each model under the pose and lighting conditions that created the query, the methods of the present invention solve the problem of determining the best approximate pose of each 3D model to account for the appearance of the query, i.e., the position and orientation of the model in three dimensional space that would lead to an image most similar to the query. The methods of the present invention do this using a small number of manually selected corresponding points in the 3D model and the 2D query. Preferably, three 2D–3D point-pairs are considered at a time to compute a tentative solution, which is computable in closed form as the solution to a quartic equation. For each such solution, the error of the remaining points—those not used in the tentative solution for the current 3 point-pairs— is noted and used to select the best of the tentative solutions. This is performed exhaustively for all such possible triples. In addition, a Gaussian jittering technique is preferably used to reverse the effect of presumed Gaussian errors in the manual marking of the points.

The methods of the present invention, alternatively referred to as the "Best Triangle" method, or the "Robust Triangle" method, is similar to the RANSAC method of the prior art; however, there are notable differences. RANSAC was developed primarily to solve the same problem, i.e., the "perspective n point problem", in which one is given the relative positions of n points in 3D space, and an equal number of points in a 2D image, and the problem is to find the perspective projection that maps the 3D points to the 2D points. The correspondence between the 2D and 3D points is known.

The difficulty arises when the 2D points have been extracted by some automatic (or even manual) process, because such points, especially in the automatic case, can be subject to gross error. This is referred to as the outlier rejection problem. If one does a least squares fit, then data that are grossly "wrong" have a large effect on the solution since the square of the error is being minimized. The problem then becomes how to reject such grossly wrong answers. There have been numerous approaches to this problem over the years; in the computer vision literature, they have in recent years been referred to as "robust" methods.

The RANSAC method tries to precompute a reasonable error bound, and then tries subsets of the data points. It removes points from each subset in an effort to achieve an acceptable total error. The subsets are chosen either at random or deterministically, and the authors give an analysis indicating how many subsets and what size of subset are appropriate based on the number of available points, and the expected error statistics. RANSAC is intended to be used in the presence of a fairly large number of points, so that exhaustive testing of all combinations is not contemplated. RANSAC uses as its basic computation either closed form solutions on three points, or least squares solutions on some larger number of points. There are those in the art who have clearly shown for the first time in the computer vision literature, the fact that for three points, there is a straight-forward solution involving solving a quartic equation, which in general can have four physically meaningful solutions.

The Best Triangle methods of the present invention use, as their fundamental computation, a closed form solution for three points, and its algorithm for that solution is based on the RANSAC quartic exposition. The Best Triangle methods of the present invention never use least squares or any iterative method of solution, as do the methods of the prior art.

However, the Best Triangle methods of the present invention have two major differences from RANSAC:

1. It exhaustively computes the solution for every possible subset of three points in the data. This is practical, because for the problems it is intended for, there are only about 12 points.
2. Rather than remove points while seeking a least squares solution using all remaining points, the Best Triangle methods of the present invention compute their solution using only the three points. The "quality" of that solution is based on how well the remaining points fit, but the solution itself is not affected by any aspect of the errors on the other points.

The Best Triangle methods of the present invention choose their final solution by ranking all solutions for three points by this "quality" factor; the solution with the lowest residuals on the remaining points is determined to be the best solution.

This achieves robustness in two different ways. First, the solution is based on three points; presumably there are three points in the data which are not grossly wrong, so one expects that the solution will at least be reasonable. On the other hand, when grossly wrong points participate in choosing which solution is the best, they can do so in one of two ways. First, they can be one of the "other points", i.e., not one of the three used in computing the solution. Among all such situations, the bad points only affect the competition among solutions. If these points are grossly wrong, then for all reasonable solutions of three points, one would expect that they contribute an approximately equal grossly wrong error, and therefore do not make a significant difference in choosing among solutions. In the case where a grossly wrong point is one of the three being used to compute the solution, one expects that it will skew the solution so much that the ranking errors contributed by all the other points will easily eliminate this solution from the competition.

For small numbers of data points to match, e.g. 12, the Best Triangle methods of the present invention are extremely fast, as compared to the methods of the prior art, since there is no need for iterative solutions. In general, the Best Triangle methods of the present invention must compute $$C(n, 3) = \frac{n!}{(n-3)!3!} = \frac{n(n-1)(n-2)}{6} = O(n^3) \quad (1)$$

solutions when there are n data points. For n=12, this is 12*11*10/6=220 solutions. Since the closed form quartic solution for three points is constant time, it does not affect the asymptotic cost of the algorithm. Obviously, this is only practical for reasonable values of n, but when n is small, it is quite effective. A least squares solution on an arbitrary number of points, by comparison, requires an iterative component to compute something like eigenvalues or singular values.

The Best Triangle methods of the present invention also add another technique to the computation. In order to compensate for the fact that only three points are being used for a solution, and assuming that the data points differ from their true values by a Gaussian error, the Best Triangle methods artificially generate a Gaussian cloud of several points around each data point, and solves the three point problem for all combinations of the points in the cloud. This offers the possibility of improving the three point solution to more closely approximate the correct solution.

Of course, if there is some reason to believe that some distribution other than Gaussian better describes the point placement errors, samples may be taken from such a distribution.

However, in most cases it is unlikely that such a distribution can be known, there is likely to be little difference from using a Gaussian distribution because only a few samples are taken, and in addition the distribution must admit of a simple method to generate samples, and often the latter is difficult for non-Gaussian distributions. Therefore, a Gaussian distribution is most likely the best choice under most circumstances.

Another method that is similar to those of the present invention is known as "recognition using alignment" or, simply "alignment". In this method, as in the methods of the present invention, triples of points are used to solve for a rigid motion. As in the methods of the present invention, these solutions are scored based on a quality measure, and the best solution wins. However, it there are some important differences. First, these prior art methods consider only an orthographic projection, or orthographic with a scaling factor, but not perspective projection. They state that closed form solutions for the perspective three point problem are impractical, and therefore they avoid them. This forces them to use, at best, the orthographic plus scale approximation, which assumes that the distance from the camera to the subject is large compared to the total depth occupied by the subject. This is not a good approximation for the apparatus used in the methods of the present invention, since pictures or models of a human head are often captured from a distance that is often only a small multiple of the size of the head, for example, from 1 meter away. The methods of the present invention take advantage of a workable solution to the perspective three point problem, and are therefore able to make a better approximation.

Although the alignment methods of the prior art give complexity bounds such as in equation 1 above, they do not contemplate exhaustively checking all possible triples, since they are in an environment where there may be a very large number, perhaps thousands, of points to draw triples from. Instead, they concern themselves with methods for pruning the search of triples, such as heuristic criteria for the likelihood that a given 3D point may be matched to a 2D point in the query. They are also in an environment where the points themselves are highly unreliable, since they have been extracted automatically by machine. Finally, the quality measure they use is not point-based. Rather, it is based on edges that have been extracted in the query image. This also is dictated by the fact that this is more reliable than errors of a large number of unreliable points.

The fundamental problem which the alignment methods of the prior art try to solve is therefore rather different than that addressed by the methods of the present invention. The alignment methods of the prior art use a fairly small set (e.g., numbering 10) of 3D models, each of which are considerably different, and they extract large numbers of unreliable points automatically. They do not know the 2D–3D point correspondences in advance, and therefore, must guess these. Most of their effort is involved in dealing with large numbers of unreliable points, they do not consider the error on the points not used for the rigid motion solution, but rather use errors related to line segments. What's more, they use an orthographic or orthographic-plus-scale approximation to perspective projection.

The present invention, by contrast, is intended for a large set (e.g., up to 1 million) of 3D models, each of which are quite similar, and it extracts a small number of relatively reliable points manually. The invention knows the 2D–3D point correspondences in advance, and therefore has no need to guess these. Most of the present invention's effort is involved in performing an exhaustive solution for all choices of point triples; it has no interest in edges of any kind, and only uses errors on the remaining corresponding points. What's more, it uses perspective projection exactly, not an approximation to perspective projection.

FIG. 1 is a schematic representation of a two dimensional mapping of a three dimensional model of a human face 100. Preferably, the face 100 has the appearance of a photograph, but at every point of this 2D representation has associated with it a datum of depth, so that although only 2D data is displayed, 3D data is nevertheless available. A human operator uses an input device such as a mouse to click on some number of points 102 which are defined as specific features of the face. In the case of FIG. 1, 12 points have been defined and marked; these are defined as the left and right corners of each eye, the pupil of each eye, the left and right corners of the lips, the center of the boundary between the two lips, and three points where the nose meets the rest of the face, at the left and right extremities of the base of the nose, and the center of the base of the nose. Preferably, these are the typical 12 features that are used. Obviously, larger or smaller numbers of feature points can be used.

Under some poses, not all of these points are visible. However, at this point we are only marking the 3D points on a 3D model. These points are marked and their 3D coordinates stored as part of the 3D model information database. This process of marking 3D points is performed for all models in the database.

Figure 2:
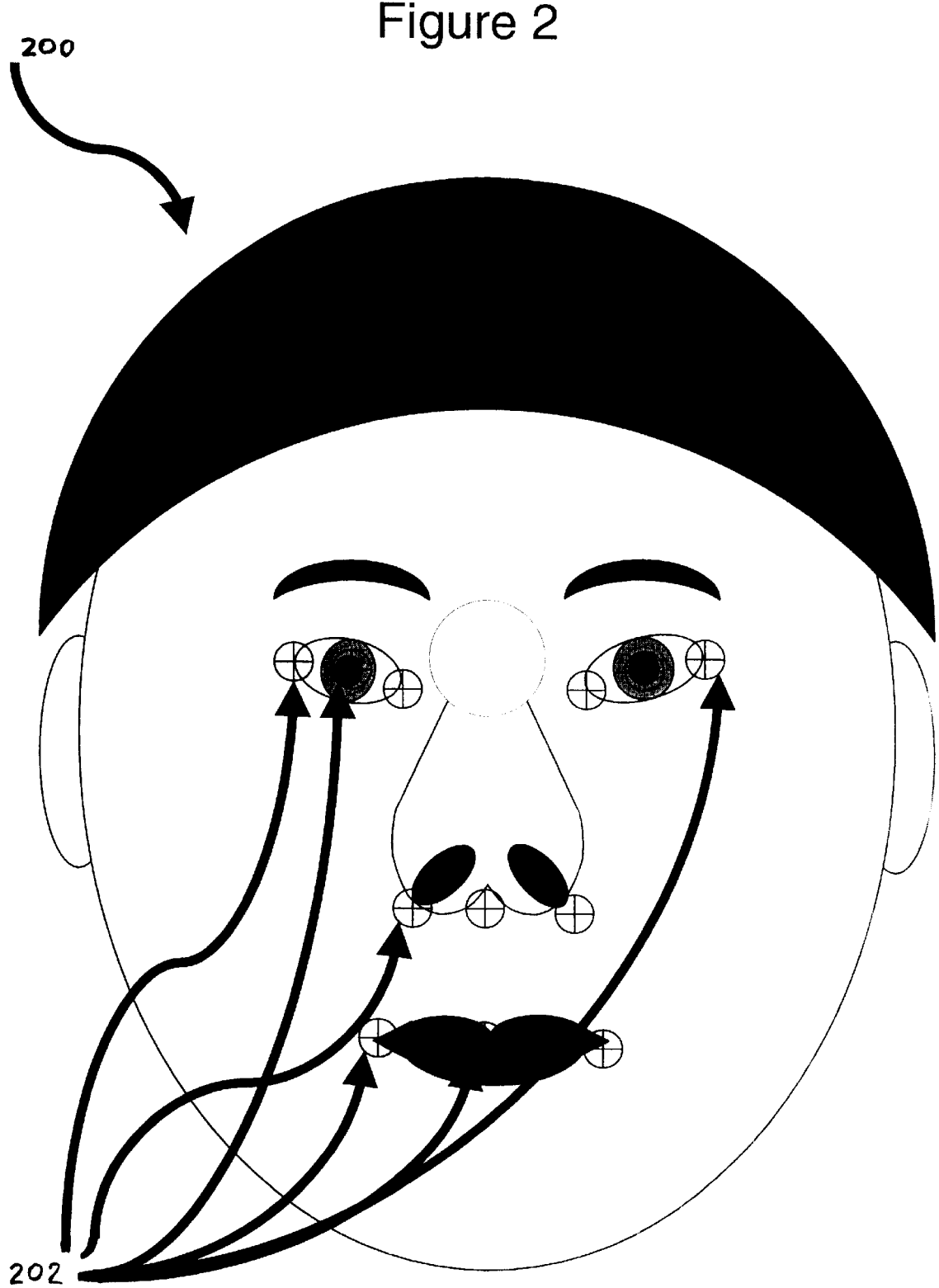
FIG. 2 illustrates a schematic representation of a two dimensional query photograph.

Referring now to FIG. 2, at some future time, a 2D query photograph 200 is presented to the system. A human operator then marks as many of the 12 defined features 202 as are visible in the query photograph 200. Note that these marks 202 are not interchangeable, so that mark number n always indicates feature number n; if feature number n is not visible, then no mark number n is made.

Figure 3:
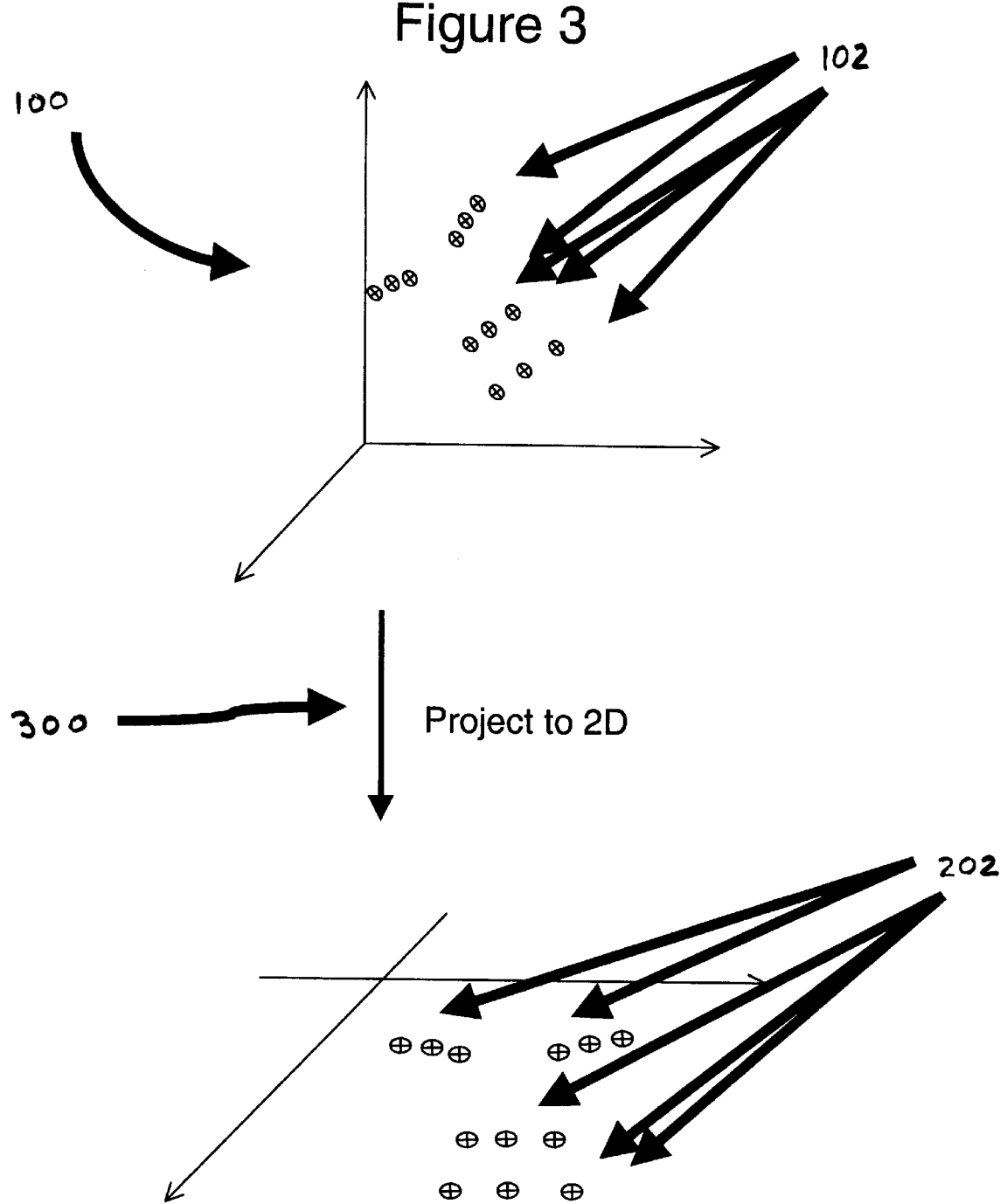
FIG. 3 illustrates the model points of the three dimensional model when imaged by a camera projection transformation resulting in the best approximation to the two dimensional query points that are marked in a query.

The problem that must then be solved is illustrated in FIG. 3. We assume, in turn, that each 3D model 100 was responsible for the 2D query image 200. The problem, for each 3D model 100, is to discover the translation and rotation (i.e., rigid motion) of the 3D model 100 so that its model points 102, when imaged by the camera projection transformation 300—a perspective projection—result in the best approximation to the 2D query points 202 that were marked in the query. We know the point correspondences, i.e., we know which 3D point gave rise to each 2D point, and vice versa.

Figure 4:
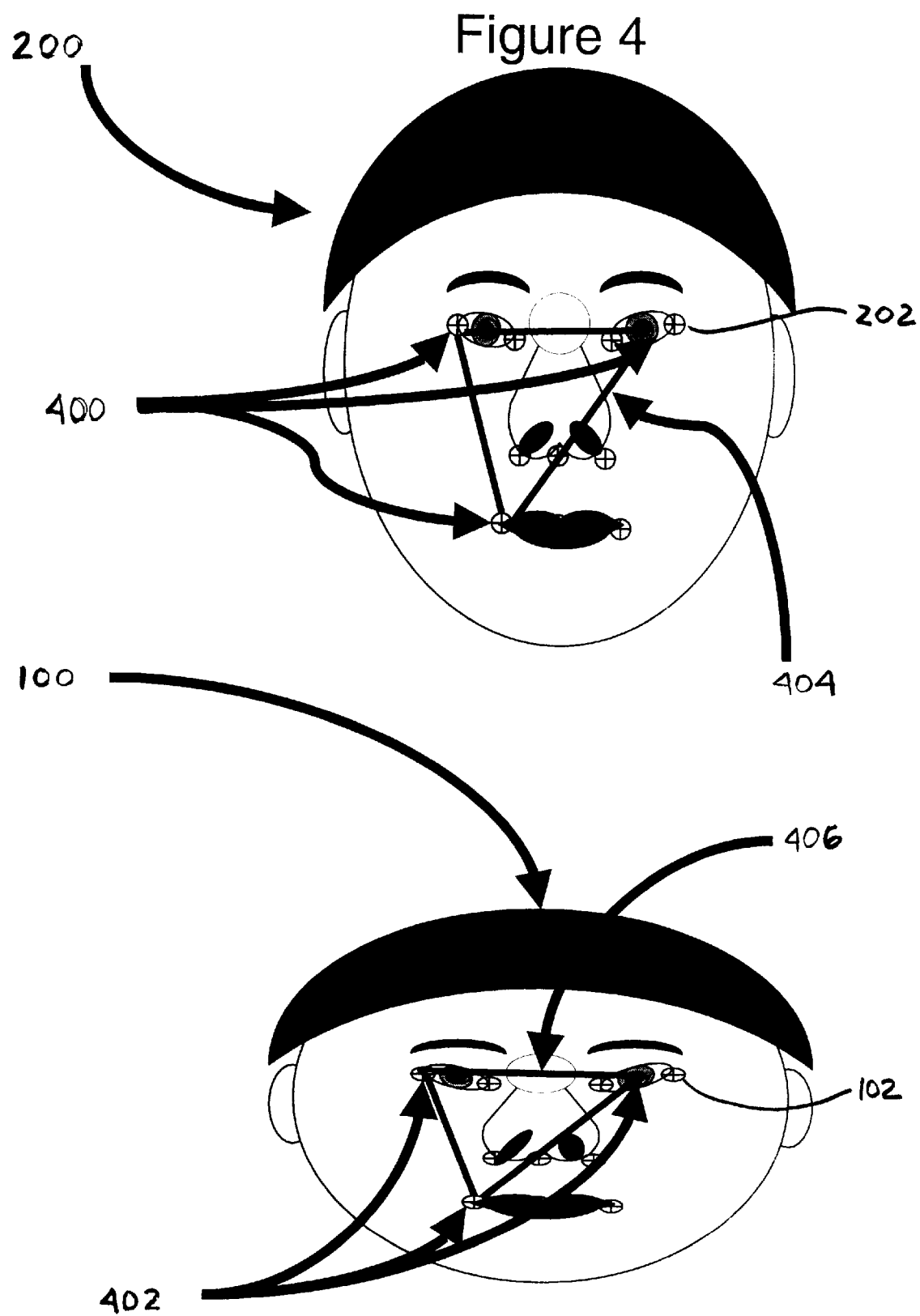
FIG. 4 illustrates the two dimensional query image of FIG. 2 and the three dimensional model, both with all visible feature points marked.

In order to avoid costly computations, such as nonlinear least squares, we consider all possible triples of features. In FIG. 4, 200 indicates the 2D query image, and 100 indicates the 3D model, both with all visible feature points marked 202, 102, respectively. (In this case, all 12 feature points were visible in the 2D query.) We systematically consider each triple 400 of feature points in the query. In this case, because there are 12 feature points, there are 12*11*10/6= 220 such triples. Each such triple corresponds to a unique triple of feature points 402 in each 3D model 100, since we know the correspondence between the features in the model and the query. We can imagine each of these triples as being joined by a triangle 404, 406. Note that the triangle 406 in the 3D model 100, is actually a triangle in three dimensional space, although it is being depicted in the figure in two dimensions only.

The first thing that must be computed is the rigid motion of the 3D model triangle 406, that results, under a fixed camera projection to 2D, in the 2D query triangle 404. Because there are two sets of only three points involved, this rigid motion can be computed in closed form by solving a quartic equation, which is known in principle from prior art.

We repeat here the RANSAC technique for solving the perspective three point problem using the solutions of a quartic equation.

Figure 5:
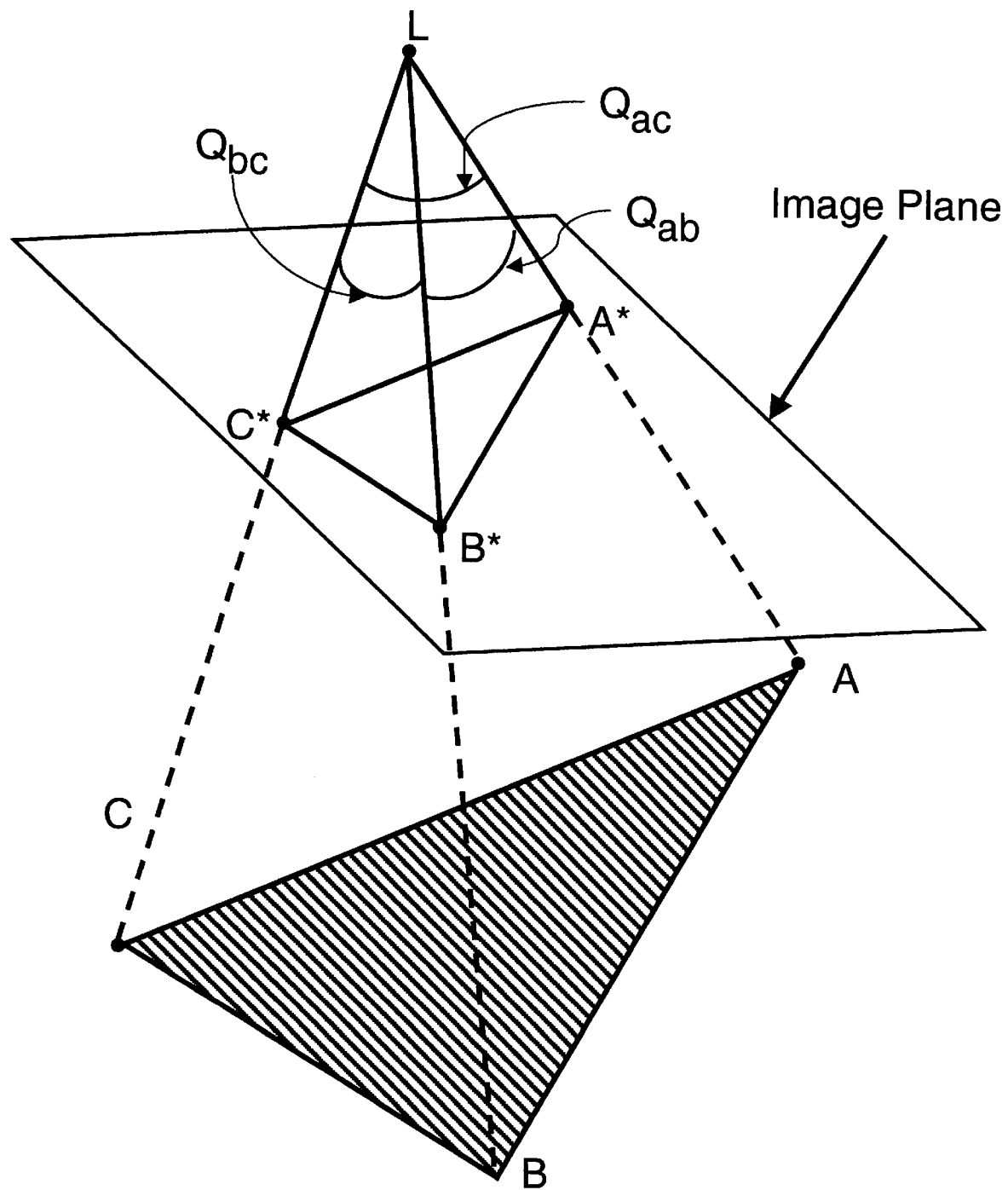
FIG. 5 illustrates a graphical representation of the perspective projection of a point p in 3-space to a point q in an image plane.

Referring now to FIG. 5, one way of defining perspective projection is that we are given a center of projection L, which is a point in 3-space, and a location and orientation of the image plane in 3-space. The perspective projection of a point p in 3-space to a point q in the image plane is performed by taking the unique line which passes through both q and L in 3-space, and defining q as the unique point where this line intersects the image plane. This obviously excludes the degenerate case where the image plane contains the center of projection.

For the purposes of this explanation, let:

$A^*$, $B^*$, $C^*$ be 3 points in the image plane.

A', B', C', be 3 points in 3-space.

Then, we want to rigidly move A', B', C' in 3-space to another set of 3 points in 3-space, A, B, C, such that the perspective projection of A is $A^*$, that of B is $B^*$, and that of C is $C^*$.

Note that if we know the three distances $\|A'-B'\|$, $\|B'-C'\|$, and $\|C'-A'\|$, then we know the triangle ABC up to rigid motion, i.e., every triangle ABC where $\|A-B\|$, $\|B-C\|$, and $\|C-A\|$ have the same values can be brought into alignment with the triangle A'B'C' by a rigid motion.

Because we know L and $A^*$, $B^*$, $C^*$, we can form the lines of projection through the A, B, C, respectively, that we want to solve for. It is therefore sufficient to find points along these lines such that $\|A-B\|$, $\|B-C\|$, and $\|C-A\|$ have the same values as $\|A'-B'\|$, $\|B'-C'\|$, and $\|C'-A'\|$, respectively.

Figure 6:
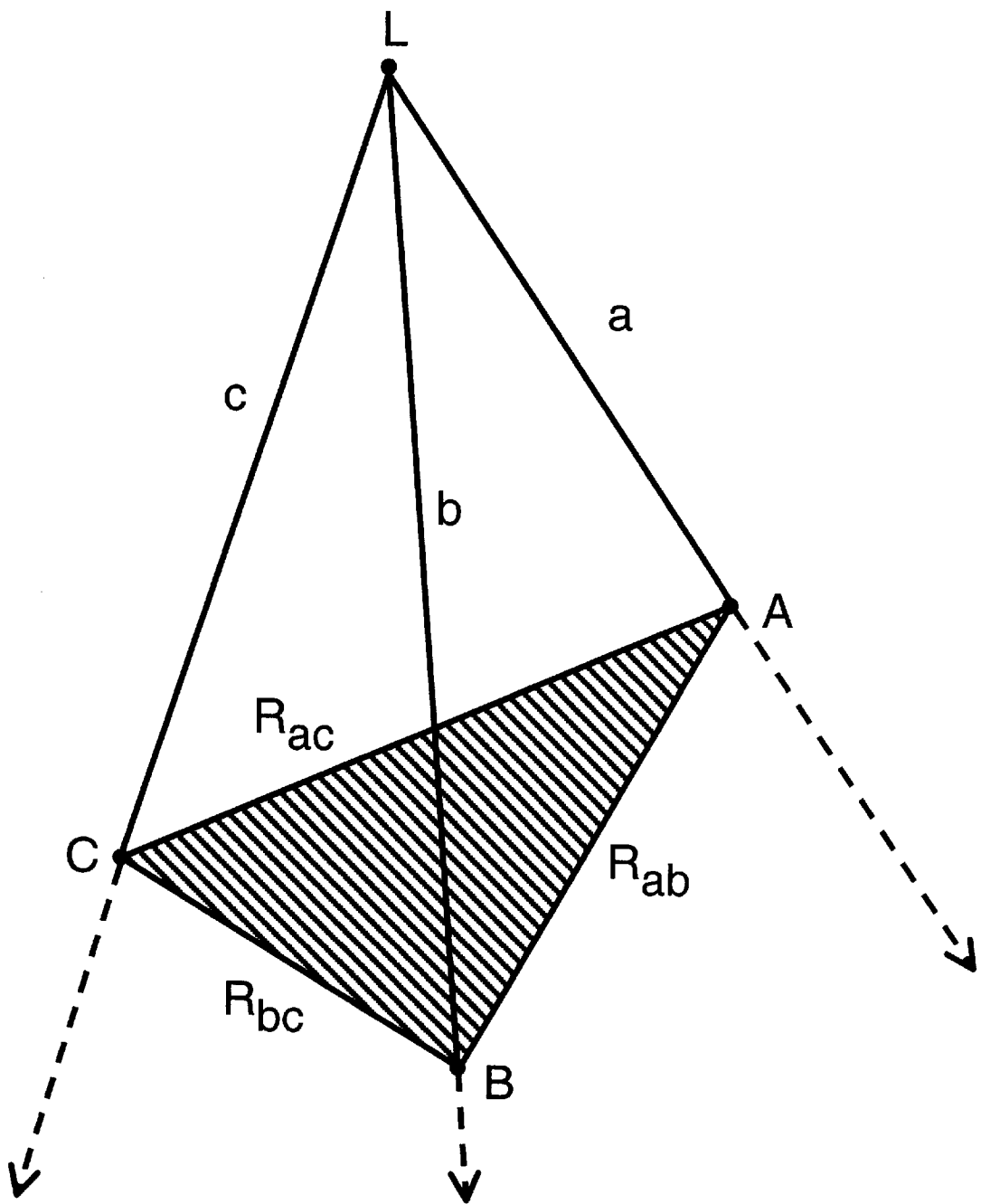
FIG. 6 illustrates a tetrahedron LABC with vertices L, A, B, and C.
Figure 7:
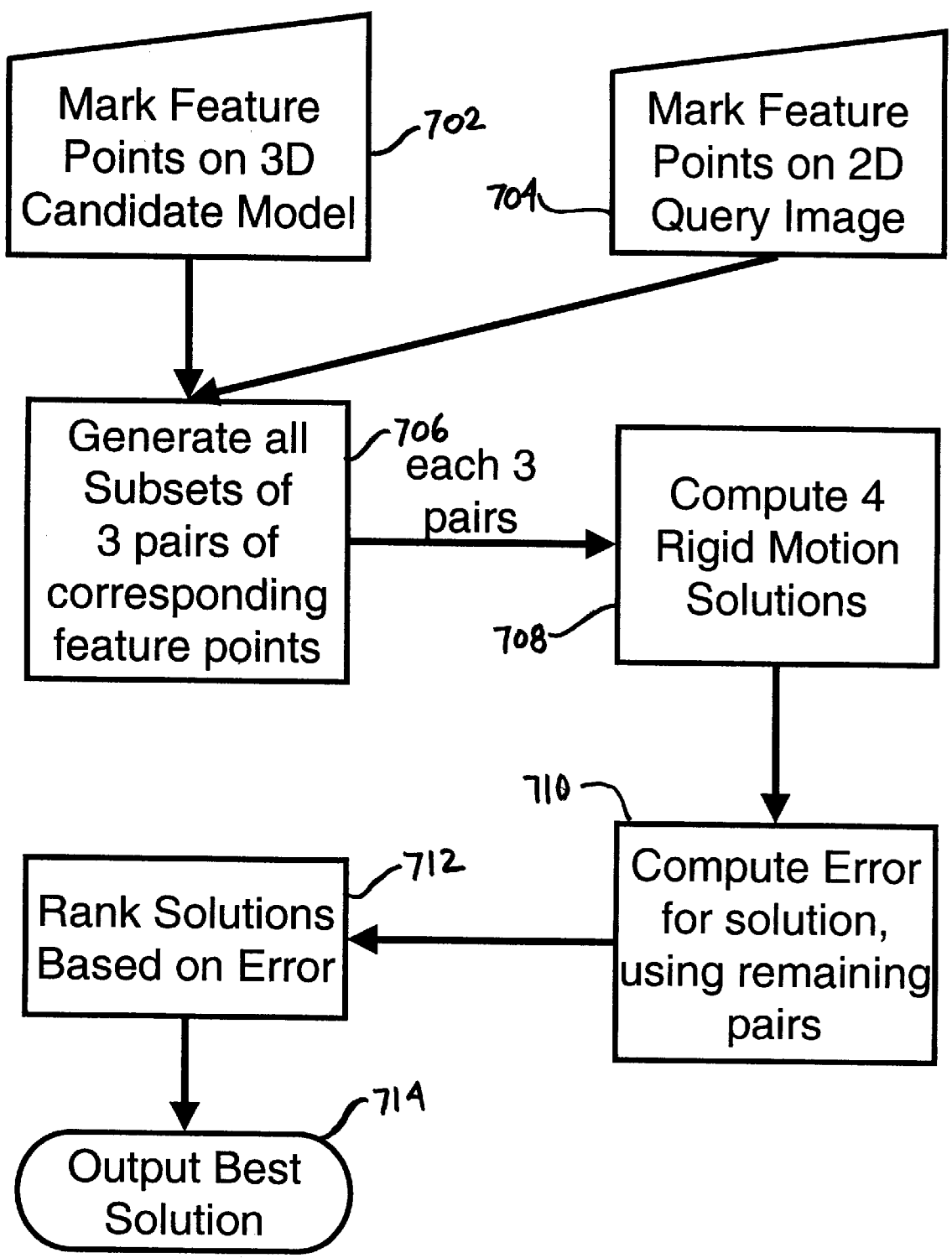
FIG. 7 is a flowchart illustrating the method of the present invention.

Referring now to FIG. 6, if we consider the tetrahedron LABC i.e., the tetrahedron with vertices L, A, B, and C, then this is equivalent to solving for the lengths of the 3 "legs", edges LA, LB, LC. Call these lengths a, b, c, respectively. Also, for compactness of notation, define $R_{ab}$, $R_{ac}$, and $R_{bc}$ to be $\|A-B\|$, $\|B-C\|$, and $\|C-A\|$, respectively.

Similarly, define $Q_{ab}$, $Q_{ac}$, and $Q_{bc}$ to be the angles that LA makes with LB, LA with LC, and LB wth LC, respectively.

Then, the solution to the perspective three point problem becomes the solution to the system of three equations:

$$(R_{ab})^2 = a^2 + b^2 - 2ab \cos Q_{ab} \qquad (2)$$

$$(R_{ac})^2 = a^2 + c^2 - 2ac \cos Q_{ac} \qquad (3)$$

$$(R_{bc})^2 = b^2 + c^2 - 2bc \cos Q_{bc} \qquad (4)$$

For compactness of notation, define the quantities K1, K2, and x by:

$$K1 = \frac{(R_{bc})^2}{(R_{ac})^2} \qquad (5)$$

$$K2 = \frac{(R_{bc})^2}{(R_{ab})^2} \qquad (6)$$

$$x = b/a \qquad (7)$$

Note that x is well defined because we assume that the none of the points in 3-space lies at the center of perspective, and hence "a" cannot be 0.

Then, the solutions of the system of equations 2–4 are given by the solutions to the quartic equation 8:

$$0 = G_4 x^4 + G_3 x^3 + G_2 x^2 + G_1 x + G_0 \qquad (8)$$

where $$G_4 = (K1K2 - K1 - K2)^2 - 4 K1K2 \cos^2 Q_{bc} \qquad (9)$$

$$G_3 = 4(K1K2 - K1 - K2)K2(1 - K1)\cos Q_{ab} + 4 K1 \cos Q_{bc}[(K1K2 + K2 - K1)\cos Q_{ac} + 2 K2 \cos Q_{ab} \cos Q_{bc}] \qquad (10)$$

$$G_2 = [2 K2(1 - K1)\cos Q_{ab}]^2 +$$

$$2 [K1K2 + K1 - K2]$$

$$[K1K2 - K1 - K2] +$$

$$4 K1 [(K1 - K2)\cos^2 Q_{bc} +$$

$$(1 - K2)K1 \cos^2 Q_{ac} - 2 K2(1 +$$

$$K1)\cos Q_{ab} \cos Q_{ac} \cos Q_{bc}] \qquad (11)$$

$$G_1 = 4(K1K2 + K1 - K2)K2(1 - K1)\cos Q_{ab} + 4 K1 [(K1K2 - K1 + K2)\cos Q_{ac} \cos Q_{bc} + 2 K1K2 \cos Q_{ab} \cos^2 Q_{ac}] \qquad (12)$$

$$G_0 = (K1K2 + K1 - K2)^2 - 4 K1^2 K2 \cos^2 Q_{ac} \qquad (13)$$

Once we have this solution, all the other points in the 3D model 100 can be moved by the same rigid motion, and projected through the camera transformation to the image. Even if we are using points from the 3D model 100 that gave rise to the 2D query 200, i.e. from the actual person whose picture we are trying to identify, the remaining points will in general not project precisely to their corresponding 2D points at this time. Due to errors in human placement of the points, roundoff errors, changes in the face over time, possibly an inaccurate camera model, lens distortion, and any number of other sources of error and noise, there will be some error in the 2D projection of these points.

Most of the time, we will be solving this problem for a 3D model which does not correctly identify the query. In that case, we would expect that the errors of the remaining points would be far greater than for the correct model.

However, there is another source of error. In many poses, some of the points that make up a triangle will be squashed together into a triangle that is extremely narrow. Under such conditions, the accuracy of the solution for the rigid transformation is subject to large numerical errors because very slight changes in the locations of the points under these conditions can lead to large changes in the rigid motion solution.

There is also the possibility that two candidate 3D models may be very similar, and if we choose the wrong triangles to use, the wrong model may win the remaining-point-error competition. To deal with these possibilities, we consider all the triples, and choose the rigid motion that results from the one with the least remaining-point error. Note that only the triangle enters into the calculation of the rigid motion. The other points only serve to choose among the 220 solutions corresponding to the 220 triangles we tried.

Although there are many reasonable and obvious choices for the "remaining-point error," we are using the definition which is commonly known as square error, or "$L_2$ error":

In what follows, $R^k$ denotes standard k-dimensional real Euclidean space. Assume we are using n points, i.e., n 3D points in correspondence with n 2D points. (In our examples, n=12.) Denote these points by the indices (1, 2, ..., n). For each selected triple, renumber the points so that the selected triple consists of the points numbered 1, 2, and 3. Denote the points in the query by $x_i$, where i is one of (1, 2, ..., n). Note that $x_i$ is a point in $R^2$. Similarly, denote the corresponding feature points in the 3D model as $y_i$, where i is one of (1, 2, ..., n) Note that $y_i$ is a point in $R^3$. Denote the rigid motion of the model that was solved for by solving the perspective three point problem by T. Note that T is a map from $R^3$ to $R^3$, which we denote by:

$$T: R^3 \to R^3 \qquad (14)$$

Let $$P: R^3 \to R^2 \qquad (15)$$

Denote the perspective projection performed by the camera. Then the problem we have solved in the perspective three-point problem, recalling that the first three points after our renumbering are the ones that were matched, is:

$$P(T(y_i)) = x_i, \text{ simultaneously for } i=(1, 2, 3) \qquad (16)$$

The remaining-point error will depend on what happens to the remaining n-3 points, i.e., to the points (4, 5, ..., n).

$$\text{Define } E_i = \|P(T(y_i)) - x_i\|^2 \qquad (17)$$

where $\|z\|$ means the usual (Euclidean) norm in $R^2$. To define this norm let $z = (z_x, z_y)$, where $z_x$ is the x component of z, and $z_y$ is the y component of z. Note that here x and y stand for the axes of $R^2$, unlike above and below, where we are using x and y as points in $R^2$ and $R^3$, respectively. Then the norm is defined by $$\|z\|^2 = \|(z_y, z_y)\|^2 = z_x^2 + z_y^2. \qquad (18)$$

$E_i$ is known as the square error at point i.

The total square error, $E_{tot}$, is then given by the sum of these quantities:

$$E_{tot} = \sum_{i=4}^{n} E_i \qquad (19)$$

Note that because the three triangle points i=(1,2,3) were solved to map exactly (up to root finding and machine roundoff error) to each other, so that the error at those points is already zero, this means we can, if we like, replace the above equation with:

$$E_{tot} = \sum_{i=1}^{n} E_i \qquad (20)$$

since $E_i = 0$ for $i = (1, 2, 3)$

In the competition among the 220 solution sets (for n=12, i.e.) of up to four solutions each, that correspond to the 220 different choices for the triple of points used to solve the perspective 3 point problem, the winning solution is the one which achieves the lowest value of $E_{tot}$.

Hand marked points can suffer from a certain amount of imprecision. This can arise from various sources, including resolution limitations of the devices being used to aid in the marking, as well as the fact that the features corresponding to the points being marked may not have perfectly well-defined locations in either the 3D model or the 2D query image. To compensate for these defects, the methods of the present invention contain an optional technique which attempts to find better points than the exact points presented to it in the data. This is done based on the assumption that the marked points obey a spherical Gaussian distribution with a mean at the "true" point position. I.e., if the true point position is at $(u,v)$ in the query, then this module assumes that the probability that this point was actually marked at $(x,y)$ is given by:

$$p(x,y) = A e^{-[(x-u)^2 + (y-v)^2]/s^2} \qquad (21)$$

where A is a normalization factor, and s is the standard deviation, which is selected ad hoc, typically at about 1–3 pixel diameters. There are well-known techniques for generating random samples from such a distribution. The algorithm uses such a technique to generate a cloud of a small number of points around the data value $(x,y)$. (The number of perturbed points to use in such a cloud is fixed for a given run of the algorithm. It can, however, be varied from query to query, but for each query, the number of points must be the same for all data points that are to be perturbed.) It does this by turning around the above distribution as a distribution of $(u,v)$ values as a function of $(x,y)$, i.e. it uses the distribution $$P(u,v) = A e^{-[(x-u)^2 + (y-v)^2]/s^2} \qquad (22)$$

which is identical to equation 21, except that we are now regarding this as a distribution of $(u,v)$ with mean $(x,y)$, to generate samples of $(u,v)$ that might have been the "true" point locations. For example, if the number of perturbed points has been set to 4, we draw 4 consecutive samples from the distribution (equation 22), repeating this process successively at each data point $(x_i, y_i)$ in the query. It then uses these extra points in the following way. Whenever a triple of points $(p_1, p_2, p_3)$ in 3D would have been matched with a triple of points $(q_1, q_2, q_3)$ in 2D, it first generates a Gaussian cloud of points around each of the $q_i$.

Typically, there are about 3–10 points in a cloud. Suppose there are k points in a cloud. Then at each $q_i$, the algorithm generates a cloud of points $$\{q_{ij}, j=(1, 2, \ldots, k)\} \qquad (23)$$

Then, whenever $q_i$ appears in a triple of points that are to be used in a perspective three-point solution, not only is $q_i$ used in the solution, but each $q_{ij}$, for all j, is used for a solution as well. I.e., if the three 2D points are $(q_1, q_2, q_3)$, then all $(q_{1j}, q_{2j}, q_{3j})$, where j takes on all values in $(1, \ldots, k)$, are used. I.e., First the solution is done using $(q_1, q_2, q_3)$. At each of $(q_1, q_2, q_3)$, a cloud of k points is generated. Then the solution is done using the j-th such cloud point in each cloud. This increases the cost of the algorithm by the constant factor (k+1).

In the example above where the number of perturbed points has been set to 4, we would draw 4 samples from the distribution at each data point $q_i$, i.e., we would draw the samples:

$q_{1,1}, q_{1,2}, q_{1,3}, q_{1,4}$ from a distribution with mean at $q_1$,
$q_{2,1}, q_{2,2}, q_{2,3}, q_{2,4}$ from a distribution with mean at $q_2$,
$q_{3,1}, q_{3,2}, q_{3,3}, q_{3,4}$ from a distribution with mean at $q_3$.

Note that each q is a point in 2-space.

Then, recalling we are computing a solution for the projection of $(p_1, p_2, p_3)$,
a solution would be computed for each of the correspondences:

$$(p_1, p_2, p_3) | \rightarrow (q_{1,1}, q_{2,1}, q_{3,1}) \qquad (24)$$

$$(p_1, p_2, p_3) | \rightarrow (q_{1,2}, q_{2,2}, q_{3,2}) \qquad (25)$$

$$(p_1, p_2, p_3) | \rightarrow (q_{1,3}, q_{2,3}, q_{3,3}) \qquad (26)$$

$$(p_1, p_2, p_3) | \rightarrow (q_{1,4}, q_{2,4}, q_{3,4}) \qquad (27)$$

A cost-saving variation of this procedure is to first solve for the pose of all triples without noise, i.e. solve using the unperturbed values of $q_i$. Then, sort the triples used in this unperturbed stage based on the quality score. Finally, run the additional perturbed k triples for only the few best solutions. There is no need to add noise to triples that provided very bad quality scores in the first place, since it is very unlikely that such small perturbations will lead to large improvements in the quality.

The methods of the present invention have been implemented in the C programming language. The methods used to compute the solution of the perspective three point problem is the one presented in the RANSAC method. This reduces the problem to solving a quartic equation. The implementation uses a quartic equation solver available in the public domain on the internet.

The primary advantage over other methods is a better tradeoff between speed and robustness. The methods of the present invention are both extremely fast and quite robust.

The methods of the present invention are particularly well suited to the application, where a small number of manually marked points with known correspondences must be used to find pose.

It does not require knowledge of a camera model, since it is robust enough that it works with a "typical" camera model, and it also does not need to solve for a camera model.

Although the code to solve a quartic is somewhat complex, this is a well-understood area. Because the methods of the present invention use the quartic solution, they are in other respects simpler than most approaches, since no heuristics are required, and no iterative solutions are required.

The methods of the present invention will now be summarized with reference to the flowcharts of FIGS. 7, 8, 9a, and 9b in which like reference numerals indicate like or similar steps. Referring now to the flowchart of FIG. 7, the method of the present invention comprises marking a predetermined number of feature points, typically by a human operator, on both a 3D model and a 2D query image at steps 702 and 704, respectively. Preferably the number of feature points chosen is in the range of 8–12. At step 706, all subsets of three pairs of corresponding feature points are generated. Given each subset of three feature points in three-dimensional space, and three corresponding feature points in two-dimensional space, the four possible three-dimensional rigid motions of the three points in three-dimensional space are computed at step 708, such that after each of these four rigid motions, a fixed perspective projection maps the three three-dimensional points precisely to the three corresponding two-dimensional points. Step 708 is then repeated for all possible subsets of three two-dimensional points marked in the query. For each solution found in step 708, an error measure is computed at step 710 which is derived from the errors in the projections of all three-dimensional marked points in the model which were not among the three points used in that solution, but which did have corresponding marked points in the two-dimensional query. At step 712, the solutions are ranked based on the error computed at step 710. Lastly, at step 714 the best solution is selected based on the ranking of step 712.

Figure 8:
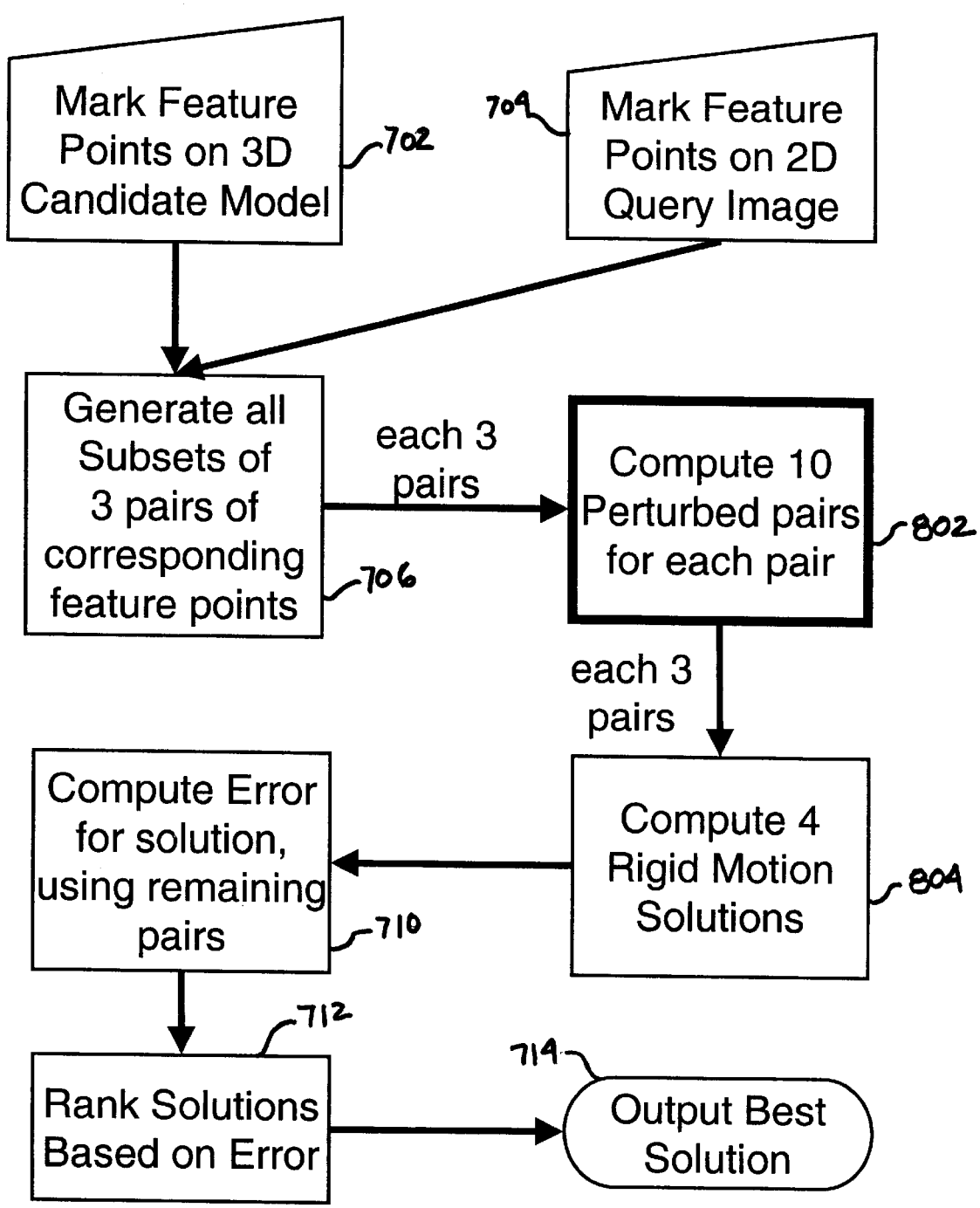
FIG. 8 is a flowchart illustrating a first variation of the method of FIG. 7.

Referring now to the flowchart of FIG. 8, a first variation of the previously described method is summarized. In the first variation of the methods of the present invention, steps 702, 704, and 706 are carried out as in the method discussed above. At step 802, a small number, about 10, perturbed points are computed which are derived from each of the original feature points. These points are typically obtained by sampling from a spherical Gaussian distribution. Step 804 is similar to step 708 discussed above with regard to the above method, except that the computation is also carried out for the corresponding perturbed points from step 802. For each solution found in step 804, an error measure is computed at step 710 which is derived from the errors in the projections of all three-dimensional marked points in the model which were not among the three points used in that solution, but which did have corresponding marked points in the two-dimensional query. At step 712, the solutions are ranked based on the error computed at step 710. Lastly, at step 714 the best solution is selected based on the ranking of step 712.

Figure 9A:
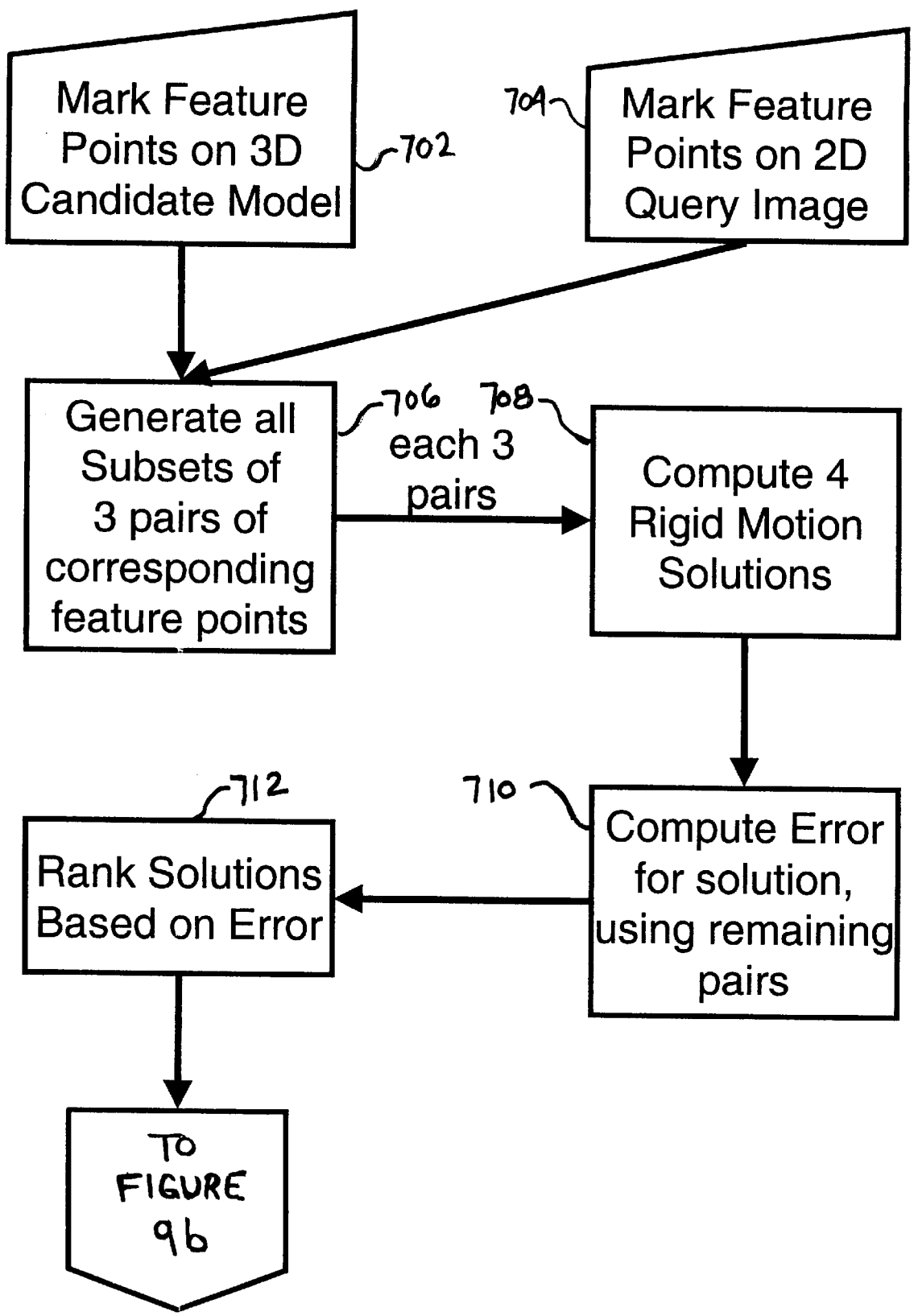
FIGS. 9a and 9b are flowcharts illustrating a second variation of the method of FIG. 7.
Figure 9B:
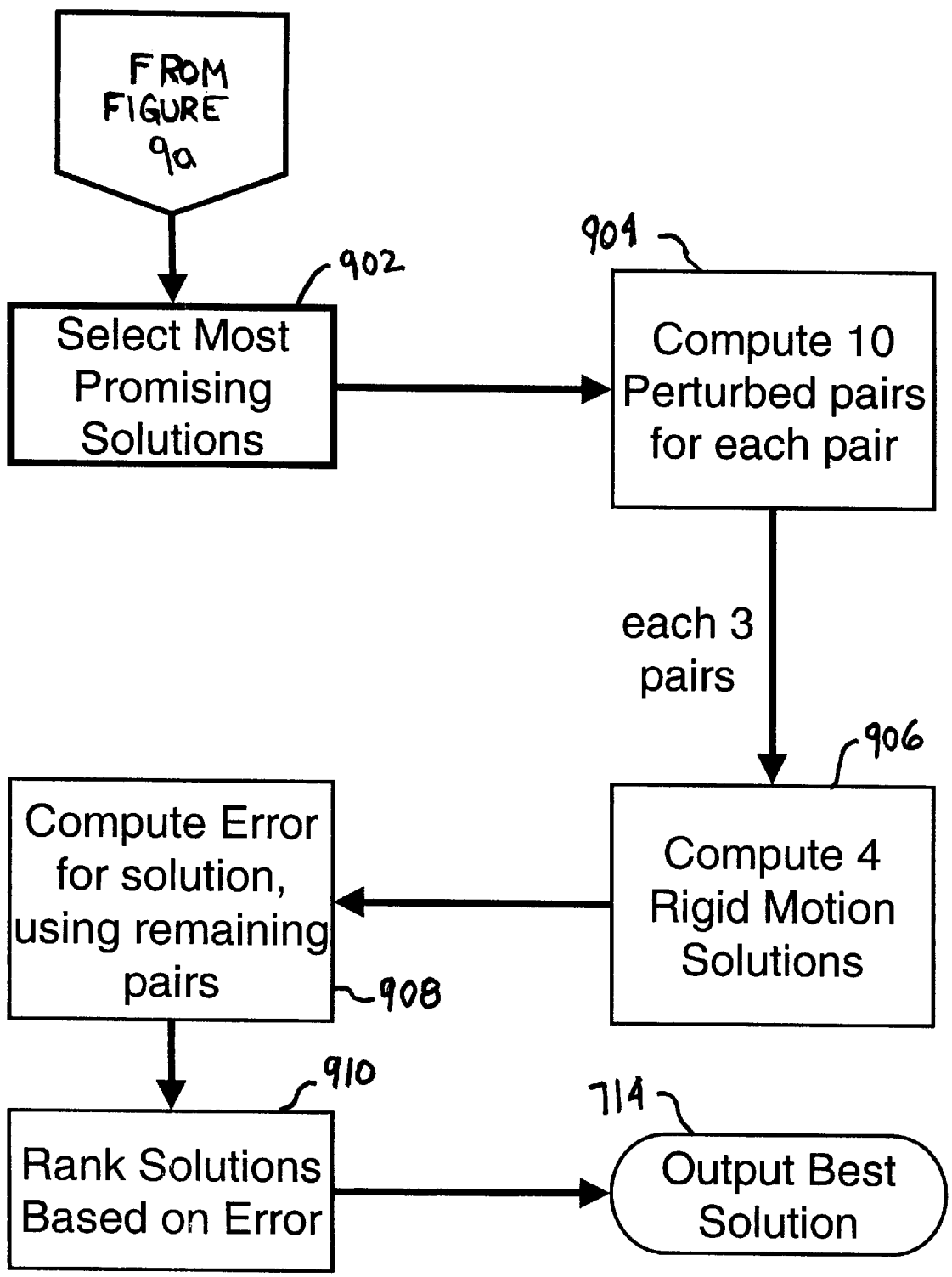

Referring now to the flowcharts of FIGS. 9a and 9b, a second variation of the methods of the present invention will be summarized. The second variation of the methods of the present invention starts with the same steps 702, 704, 706, 708, 710, and 712 as the method described above with regard to FIG. 7. However, instead of step 714, where the best solution is selected based on the ranking of step 712, a subset of the most promising solutions are selected at step 902 based on the ranking of step 712. Similar to step 802 described above with regard to the first variation of the methods of the present invention, a small number, about 10, of perturbed points are computed at step 904 which are derived from each of the original feature points which are members of promising subset. Unlike step 802, only the "promising" subset of point-pair triples are used. At step 906, the computation of step 804 is carried out on the corresponding perturbed points from step 904. At step 908, for each solution found in step 906, an error measure is computed which is derived from the errors in the projections of the corresponding perturbed three-dimensional marked points in the model which were not among the three points used in that solution, but which did have corresponding marked points in the two-dimensional query. At step 910, the solutions from steps 708 and 906 are ranked based on the error computed in steps 710 and 908. Lastly, at step 714, best solution is selected based on the ranking of step 910.

While there has been shown and described what is considered to be preferred embodiments of the invention, it will, of course, be understood that various modifications and changes in form or detail could readily be made without departing from the spirit of the invention. It is therefore intended that the invention be not limited to the exact forms described and illustrated, but should be constructed to cover all modifications that may fall within the scope of the appended claims.

What is claimed is:

1. A method for computing the location and orientation of an object in three-dimensional space, the method comprising the steps of:
    (a) marking a plurality of feature points on a three-dimensional model and corresponding feature points on a two-dimensional query image;
    (b) for all possible subsets of three two-dimensional feature points marked in step (a), computing the four possible three-dimensional rigid motion solutions of a set of three points in three-dimensional space such that after each of the four rigid motions, under a fixed perspective projection, the three three-dimensional points are mapped precisely to the three corresponding two-dimensional points;
    (c) for each solution found in step (b), computing an error measure derived from the errors in the projections of all three-dimensional marked points in the three-dimensional model which were not among the three points used in the solution, but which did have corresponding marked points in the two-dimensional query image;
    (d) ranking the solutions from step (c) based on the computed error measure; and
    (e) selecting the best solution based on the ranking in step (d).

2. The method of claim 1, wherein the number of feature points marked in step (a) is in the range of 8–12.

3. The method of claim 1, further comprising, after step (a), the step of computing a predetermined number of perturbed points derived from each of the feature points wherein the computation of step (b) is on all possible subsets of three two-dimensional points marked in the query image, and in addition on the corresponding perturbed points.

4. The method of claim 3, wherein the predetermined number of perturbed points are obtained by sampling from a spherical Gaussian distribution.

5. The method of claim 1, after step (d), further comprising the steps of:
    (i) choosing a subset of the solutions from step (c) based on the ranking of step (d);
    (ii) computing a predetermined number of perturbed points derived from each of the subset of the solutions;
    (iii) repeating step (b) on the predetermined number of perturbed points; and
    (iv) repeating step (c) for each solution found in step (iii); wherein the ranking of step (d) is based on the error computed in both steps (c) and (iv).

6. The method of claim 5, wherein the subset of solutions chosen is a predetermined portion of the ranked solutions.

7. The method of claim 6, wherein the predetermined portion is the top 10% of the ranked solutions.

8. The method of claim 5, wherein the predetermined number of perturbed points are obtained by sampling from a spherical Gaussian distribution.

9. A computer program product embodied in a computer-readable medium for computing the location and orientation of an object in three-dimensional space, the computer program product comprising:
    (a) computer readable program code means for marking a plurality of feature points on a three-dimensional model and corresponding feature points on a two-dimensional query image;

(b) computer readable program code means for computing, for all possible subsets of three two-dimensional feature points marked, the four possible three-dimensional rigid motion solutions of a set of three points in three-dimensional space such that after each of the four rigid motions, under a fixed perspective projection, the three three-dimensional points are mapped precisely to the three corresponding two-dimensional points;

(c) computer readable program code means for computing, for each solution, an error measure derived from the errors in the projections of all three-dimensional marked points in the three-dimensional model which were not among the three points used in the solution, but which did have corresponding marked points in the two-dimensional query image;

(d) computer readable program code means for ranking the solutions based on the computed error measure; and (e) computer readable program code means for selecting the best solution based on the ranking.

10. The computer program product of claim 9, wherein the number of feature points marked is in the range of 8–12.

11. The computer program product of claim 9, further comprising computer readable program code means for computing a predetermined number of perturbed points derived from each of the feature points wherein the computation in (b) is on all possible subsets of three two-dimensional points marked in the query image, and in addition on the corresponding perturbed points.

12. The computer program product of claim 11, wherein the predetermined number of perturbed points are obtained by sampling from a spherical Gaussian distribution.

13. The computer program product of claim 9, further comprising:

(i) computer readable program code means for choosing a subset of the solutions from (c) based on the ranking of (d);

(ii) computer readable program code means for computing a predetermined number of perturbed points derived from each of the subset of the solutions;

(iii) computer readable program code means for repeating (b) on the predetermined number of perturbed points; and (iv) computer readable program code means for repeating (c) for each solution found in (iii);

wherein the ranking of (d) is based on the error computed in both (c) and (iv).

14. The computer program product of claim 13, wherein the subset of solutions chosen is a predetermined portion of the ranked solutions.

15. The computer program product of claim 14, wherein the predetermined portion is the top 10% of the ranked solutions.

16. The computer program product of claim 13, wherein the predetermined number of perturbed points are obtained by sampling from a spherical Gaussian distribution.

17. A program storage device readable by machine, tangibly embodying a program of instructions executable by the machine to perform method steps for computing the location and orientation of an object in three-dimensional space, the method comprising the steps of:

(a) marking a plurality of feature points on a three-dimensional model and corresponding feature points on a two-dimensional query image;

(b) for all possible subsets of three two-dimensional feature points marked in step (a), computing the four possible three-dimensional rigid motion solutions of a set of three points in three-dimensional space such that after each of the four rigid motions, under a fixed perspective projection, the three three-dimensional points are mapped precisely to the three corresponding two-dimensional points;

(c) for each solution found in step (b), computing an error measure derived from the errors in the projections of all three-dimensional marked points in the three-dimensional model which were not among the three points used in the solution, but which did have corresponding marked points in the two-dimensional query image;

(d) ranking the solutions from step (c) based on the computed error measure; and (e) selecting the best solution based on the ranking in step (d).

18. The method of claim 17, wherein the number of feature points marked in step (a) is in the range of 8–12.

19. The method of claim 17, further comprising, after step (a), the step of computing a predetermined number of perturbed points derived from each of the feature points wherein the computation of step (b) is on all possible subsets of three two-dimensional points marked in the query image, and in addition on the corresponding perturbed points.

20. The method of claim 19, wherein the predetermined number of perturbed points are obtained by sampling from a spherical Gaussian distribution.

21. The method of claim 17, after step (d), further comprising the steps of:

(i) choosing a subset of the solutions from step (c) based on the ranking of step (d);

(ii) computing a predetermined number of perturbed points derived from each of the subset of the solutions;

(iii) repeating step (b) on the predetermined number of perturbed points; and (iv) repeating step (c) for each solution found in step (iii);

wherein the ranking of step (d) is based on the error computed in both steps (c) and (iv).

22. The method of claim 21, wherein the subset of solutions chosen is a predetermined portion of the ranked solutions.

23. The method of claim 22, wherein the predetermined portion is the top 10% of the ranked solutions.

24. The method of claim 21, wherein the predetermined number of perturbed points are obtained by sampling from a spherical Gaussian distribution.

* * * * *